US009850760B2

(12) United States Patent
Crosatti et al.

(10) Patent No.: US 9,850,760 B2
(45) Date of Patent: Dec. 26, 2017

(54) DIRECTED COOLING FOR ROTATING MACHINERY

(71) Applicant: HONEYWELL INTERNATIONAL INC., Morristown, NJ (US)

(72) Inventors: Lorenzo Crosatti, Phoenix, AZ (US); Jason Smoke, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 254 days.

(21) Appl. No.: 14/687,464

(22) Filed: Apr. 15, 2015

(65) Prior Publication Data

US 2016/0305249 A1 Oct. 20, 2016

(51) Int. Cl.
*F01D 5/08* (2006.01)
*F04D 29/32* (2006.01)
(Continued)

(52) U.S. Cl.
CPC ............... *F01D 5/087* (2013.01); *F01D 5/04* (2013.01); *F01D 5/046* (2013.01); *F01D 5/048* (2013.01); *F01D 5/082* (2013.01); *F01D 5/12* (2013.01); *F01D 5/34* (2013.01); *F01D 25/005* (2013.01); *F01D 25/12* (2013.01); *F04D 29/28* (2013.01); *F04D 29/324* (2013.01); *F04D 29/582* (2013.01); *F05D 2230/23* (2013.01);
(Continued)

(58) Field of Classification Search
CPC . F01D 5/087; F01D 5/04; F01D 5/046; F01D 5/048; F01D 5/082; F01D 5/12; F01D 5/34; F01D 25/005; F01D 25/12; F04D 29/28; F04D 29/324; F04D 29/582; F05D 2230/23; F05D 2230/236; F05D 2240/24; F05D 2260/20
See application file for complete search history.

(56) References Cited

U.S. PATENT DOCUMENTS 4,335,997 A * 6/1982 Ewing .................... F01D 5/048
416/185
4,807,433 A * 2/1989 Maclin .................. F01D 5/081
415/115

(Continued)

FOREIGN PATENT DOCUMENTS

CN 203742672 7/2014
FR 1122205 A 9/1956

(Continued)

OTHER PUBLICATIONS

Extended EP Search Report for Application No. 16163951.3-1610 dated Aug. 29, 2016.

(Continued)

*Primary Examiner* — Woody Lee, Jr.
*Assistant Examiner* — Eric Zamora Alvarez
(74) *Attorney, Agent, or Firm* — Lorenz & Kopf, LLP

(57) ABSTRACT

A rotating machine includes a hub portion, wherein the hub portion comprises a forward face and an aft face. The rotating machine further includes a cooling channel formed on either the forward face or the aft face and configured to direct cooling air to a location on the rotating machine, wherein the cooling channel extends from a radially inner location along the face to a radially outer location along the face, and wherein the cooling channel is configured as a recess formed into an outer surface of the face.

8 Claims, 6 Drawing Sheets

(51) Int. Cl.

| | |
|---|---|
| ***F01D 5/04*** | (2006.01) |
| ***F01D 5/12*** | (2006.01) |
| ***F04D 29/28*** | (2006.01) |
| ***F04D 29/58*** | (2006.01) |
| ***F01D 25/12*** | (2006.01) |
| ***F01D 25/00*** | (2006.01) |
| ***F01D 5/34*** | (2006.01) |

(52) U.S. Cl.
CPC .... *F05D 2230/236* (2013.01); *F05D 2240/24* (2013.01); *F05D 2260/20* (2013.01)

(56) References Cited

U.S. PATENT DOCUMENTS

| | | | | |
|---|---|---|---|---|
| 6,575,702 | B2 | 6/2003 | Jackson et al. | |
| 6,609,891 | B2 | 8/2003 | Leeke et al. | |
| 6,699,015 | B2 | 3/2004 | Villhard | |
| 6,735,956 | B2 | 5/2004 | Romani | |
| 7,743,613 | B2 | 6/2010 | Lee et al. | |
| 7,780,414 | B1 | 8/2010 | Liang | |
| 8,087,249 | B2 * | 1/2012 | Ottaviano ................ | F02C 3/08 60/726 |
| 8,137,075 | B2 * | 3/2012 | Howe ................ | F04D 27/0246 416/185 |
| 8,251,660 | B1 | 8/2012 | Liang | |
| 8,360,726 | B1 | 1/2013 | Liang | |
| 8,821,122 | B2 | 9/2014 | Borufka et al. | |
| 2009/0056125 | A1 | 3/2009 | Howe et al. | |
| 2011/0318183 | A1 * | 12/2011 | Noronha ............... | B23P 15/006 416/189 |
| 2012/0177480 | A1 | 7/2012 | Wolfgram et al. | |
| 2013/0170954 | A1 | 7/2013 | Pauli et al. | |
| 2013/0259685 | A1 | 10/2013 | Are et al. | |
| 2013/0280036 | A1 | 10/2013 | Jan et al. | |
| 2014/0000282 | A1 | 1/2014 | Zelesky et al. | |
| 2014/0169981 | A1 | 6/2014 | Bales et al. | |
| 2014/0170433 | A1 | 6/2014 | Schick et al. | |
| 2014/0255206 | A1 | 9/2014 | Knorr et al. | |
| 2014/0348664 | A1 | 11/2014 | Jan et al. | |
| 2015/0003973 | A1 | 1/2015 | Lee et al. | |

FOREIGN PATENT DOCUMENTS

| | | | |
|---|---|---|---|
| FR | 2769341 | | 4/1999 |
| GB | 571658 | A | 9/1945 |
| WO | 2013167513 | A1 | 11/2013 |

OTHER PUBLICATIONS

Zhang Y, et al; Experimental Investigation of Turbine Phantom Cooling on Suction Side With Combustor-Turbine Leakage Gap Flow and Endwall Film Cooling; The American Society of Mechanical Engineers; Feb. 4, 2015 ASME DC Proceedings GT2012 vol. 4: Heat Transfer, Parts A and B.

Ewing, B.A.; A Solid-To-Solid Hip-Bond Processing Concept for the Manufacture of Dual-Property Turbine Wheels for Small Gas Turbines; 1980 ; Retrieved on Feb. 4, 2015: http://www.tms.org/superalloys/10.7449/1980/Superalloys_1980_169_178.pdf.

* cited by examiner

DIRECTED COOLING FOR ROTATING MACHINERY

TECHNICAL FIELD

The present disclosure relates to directed cooling for rotating machinery. More particularly, the present disclosure relates to cooling features incorporated into rotating machinery that collect a cooling fluid from an area of lower relative velocity and increases its kinetic energy/momentum by "pumping" it to a higher radius through operation of the rotating machinery.

BACKGROUND

Various types of rotating machine require cooling. A subset of such rotating machinery includes those fabricated by metallurgically bonding a hub portion to a ring portion. In these examples, the hub portion includes an outer circumference that is bonded to an inner circumference of the ring portion, thus forming a circumferential bond line at the interface between the outer circumference of the hub and the inner circumference of the ring. Hub/ring fabrication of rotating machinery is desirable because it allows for the use of different alloys for the hub portion and for the ring portion, among other reasons.

Non-limiting examples of such rotating machinery that requires cooling, whether they be bonded along a bond line or not, include axial turbines and compressors, radial turbines and impellers, and others as will be appreciated by those having ordinary skill in the art. FIGS. 1 and 2 are provided for purposes of illustrating some of these examples. More particularly, FIG. 1 is a perspective view of an axial turbine rotor bladed disk 100 as known in the prior art. The turbine rotor bladed disk 100 has a hub 102, a ring 104, and a plurality of blades 106 on the ring 104 that are configured to withstand a wide range of temperatures. Generally, the hub 102 is disk-shaped and surrounded by the ring 104. The blades 106 extend radially outward from the ring 104. The hub 102 and ring 104 are diffusion-bonded together along bond line 103 and are generally formed from superalloy materials. Both components may be formed from the same material or may be formed from materials that vary in composition. The hub 102 and/or ring 104 may be cast into equiaxed, directionally solidified, or single crystal components.

Additionally, FIG. 2 is an isometric view of a radial turbine 200 as known in the prior art. As can be seen in FIG. 2, radial turbine 200 includes a hub 266 and a ring 256, with the ring 256 include a plurality of blade segments 258, which are circumferentially spaced around and extend radially outward on the ring 256. A bond line 253 illustrates the bonding region between the hub 266 and the ring section 256. As with the axial turbine example of FIG. 1, the radial turbine example of FIG. 2 has the hub 266 and the ring 256 diffusion-bonded together along the bond line 253 and are generally formed from superalloy metals, which may be the same or different.

During operation, rotating machinery is often exposed to elevated temperatures. In the case of the exemplary rotating machinery noted above in FIGS. 1 and 2, such elevated temperatures may be caused by the impingement of hot gasses upon the machinery, or by the compression of gasses as a function of the machinery's operation. As the temperature of the rotating machinery increases, some areas of the rotating machinery, which in some examples may include the bond line (e.g., bond line 103 or 253), are less able to withstand structural loads placed on the rotating machinery. Beyond a certain temperature, the rotating machinery could fail at these areas during operation. Further, exposure to high temperatures may cause accelerated low-cycle fatigue (LCF) of the rotating machinery.

FIG. 3 is provided to illustrate this problem in the context of the radial turbine 200 shown in FIG. 2. More particularly, FIG. 3 shows a segment 200A of the radial turbine 200, with its forward end 285 at left, and it rearward end 286 at right. During operation, hot gasses are directed toward the leading edge of blade segment 258. These hot gasses cause a temperature maximum at the forward end of bond line 253, which is illustrated by oval 290. Such temperature maxima at the bond line 253, as noted above, may undesirably cause structural failure or accelerated LCF of the radial turbine.

As such, it would be desirable to provide rotating machinery that is not susceptible to structural failure or accelerated LCF due to exposure to elevated temperatures. To accomplish the foregoing aim, it would be desirable to provide cooling directed at the heat-susceptible areas of the rotating machinery, which, in the case of rotating machinery including a hub portion bonded to a ring portion, may be a bond line, in order to minimize the temperatures to which such heat-susceptible areas exposed. Furthermore, other desirable features and characteristics of the present disclosure will become apparent from the subsequent detailed description and the appended claims, taken in conjunction with the accompanying drawings and this background.

BRIEF SUMMARY

The present disclosure broadly provides directed cooling for rotating machinery. In one exemplary embodiment, a rotating machine includes a hub portion, wherein the hub portion comprises a forward face and an aft face. The rotating machine further includes a cooling channel formed on either the forward face or the aft face and configured to direct cooling air to a location on the rotating machine, wherein the cooling channel extends from a radially inner location along said face to a radially outer location along said face, and wherein the cooling channel is configured as a recess formed into an outer surface of said face.

In another exemplary embodiment, a rotating machine includes a hub portion, wherein the hub portion includes an outer circumference, an inner circumference, a forward face, and an aft face. The rotating machine further includes a ring portion, wherein the ring portion includes an inner circumference that is metallurgically bonded to the outer circumference of the hub portion along a circumferential bond line. Furthermore, the rotating machine includes a cooling channel formed on either the forward face or the aft face and configured to direct cooling air to the bond line, wherein the cooling channel extends from a radially inner location along said face to a radially outer location along said face, and wherein the cooling channel is configured as a recess formed into an outer surface of said face.

In yet another exemplary embodiment, a rotating machine includes a hub portion, wherein the hub portion includes an outer circumference, an inner circumference, a forward face, and an aft face. The rotating machine further includes a ring portion, wherein the ring portion includes an inner circumference that is metallurgically bonded to the outer circumference of the hub portion along a circumferential bond line. Furthermore, the ring portion additionally includes a forward end and an aft end, wherein either the forward end or the aft end includes a circumferential flange extending outward from said end and positioned radially above the bond line, and wherein said face includes a circumferential recess radially below the bond line. The flange and the recess define a circumferential bond line channel along both said end and said face that distributes cooling air circumferentially along the bond line.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

The present disclosure broadly provides directed cooling for rotating machinery, including but not limited to rotating machinery provided in a bonded hub/ring configuration. Examples of such rotating machinery include, but are not limited to, axial turbines and compressors, radial turbines and impellers. Regardless of the particular implementation, in each embodiment of the present disclosure the rotating machine includes what will be referred to herein as a "hub" portion. The term "hub," as used herein, should not be thought of as limited to the context of hub/ring bonded configurations, but should be understood merely to refer to a central member of the rotating machine, onto which a fluid "pumping" or cooling channel may be provided. Typically, the hub portion includes an outer circumference, an inner circumference, a forward face, and an aft face. Further, in some embodiments of the present disclosure that are in fact directed to bonded hub/ring rotating machine configurations, the rotating machine further includes a ring portion. When provided, the ring portion typically includes an inner circumference that is metallurgically bonded to the outer circumference of the hub portion along a circumferential bond line. In the case of turbines, compressors, and impellers, the ring portion will also include a plurality of blades extending radially outward therefrom.

To achieve the desire aim of directed cooling as set forth herein, embodiments may include the aforementioned cooling channel formed on either the forward face or the aft face (depending on the particular implementation), which is configured to direct or "pump" a cooling fluid, typically cooling air, to the desired location on the rotating machine. Where the rotating machine is in the exemplary hub/ring bonded configuration, this desired location may optionally be the bond line. The cooling channel is provided so as to extend from a radially inner location along the face (again, either forward or aft, depending on the particular implementation) to a radially outer location along the face. The cooling channel is configured as a recess formed into an outer surface of the face, and in this manner can be easily machined into the appropriate face during the manufacturing process. Thus, it should be understood that the general purpose of the subject cooling channel is to collect a cooling fluid from an area of lower relative velocity and increase its kinetic energy/momentum by "pumping" it to a higher radius by taking advantage of the rotation inherent in the operation of a rotating machine.

Figure 1:
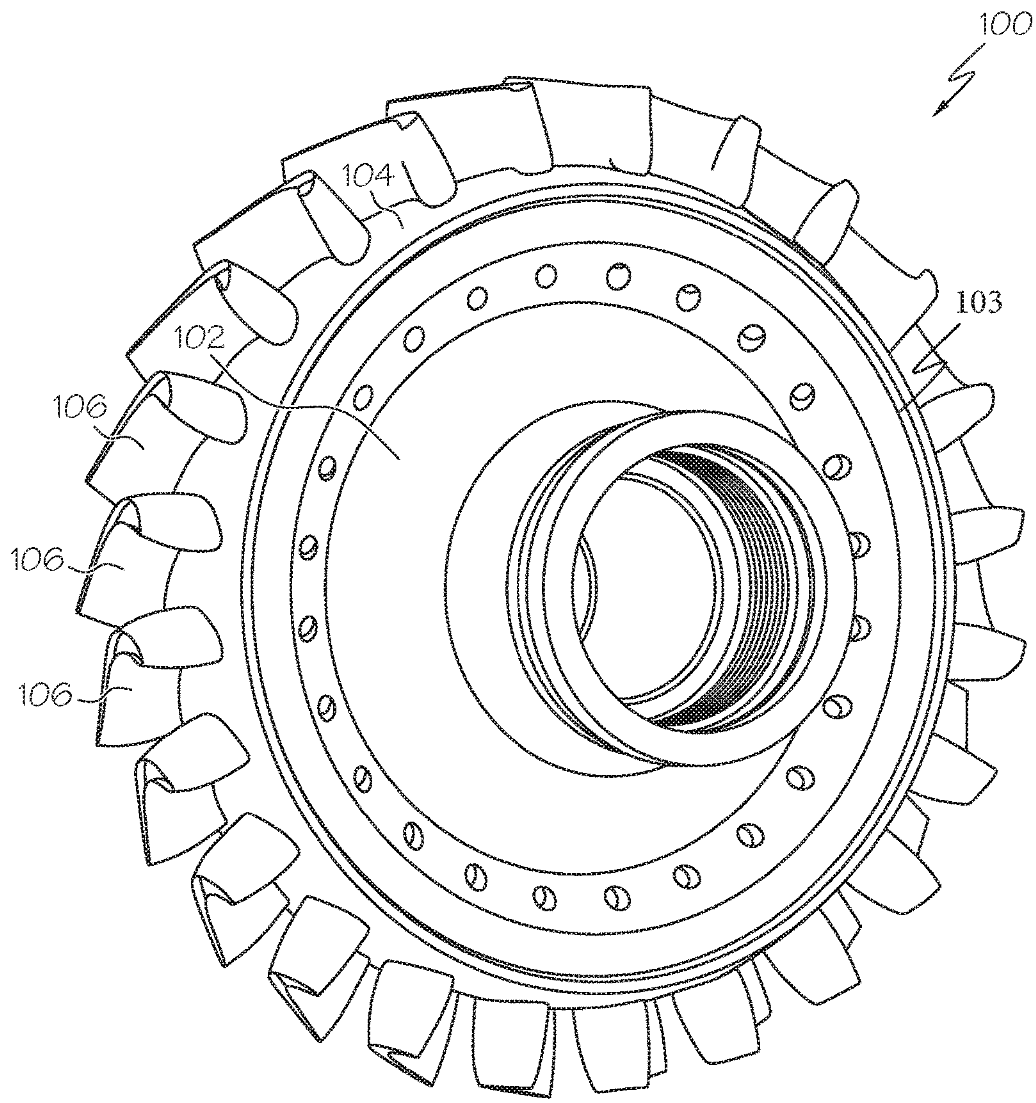
FIG. 1 is a perspective view of an axial turbine rotor as known in the prior art.
Figure 2:
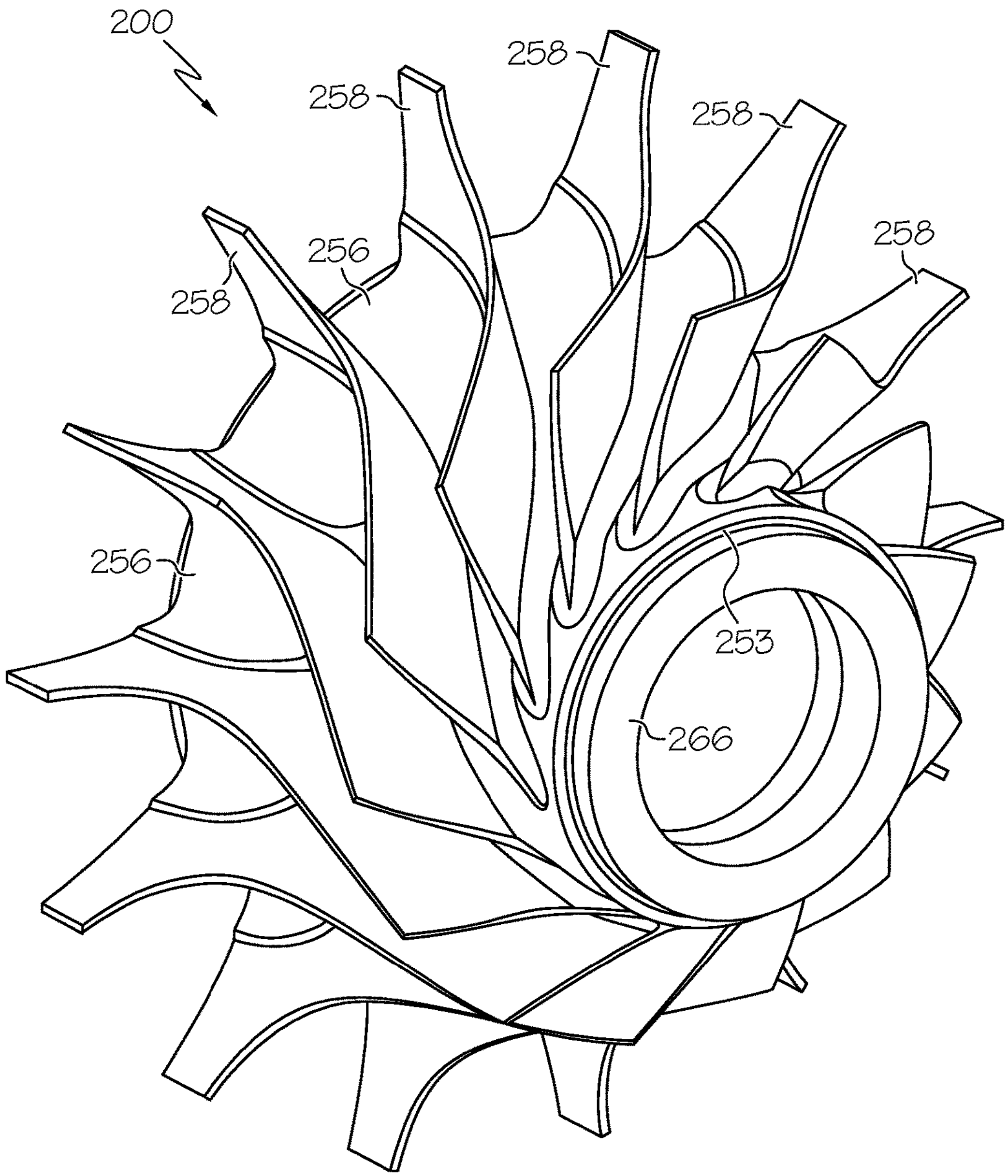
FIG. 2 is an isometric view of a radial turbine as known in the prior art.
Figure 3:
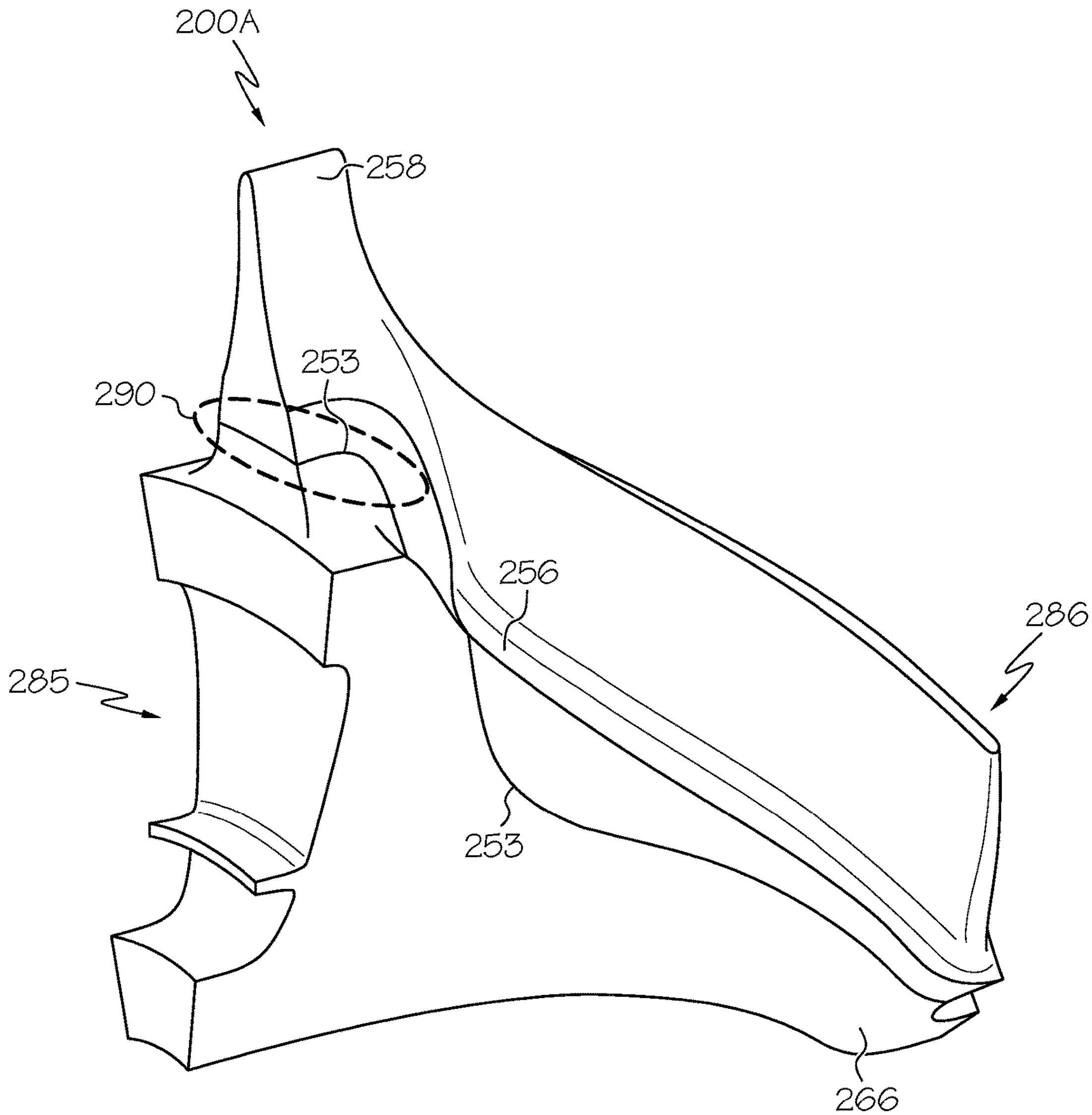
FIG. 3 is a view of a segment of the radial turbine of FIG. 2 provided to illustrate bond line high temperature exposure problems encountered in the prior art.
Figure 4A:
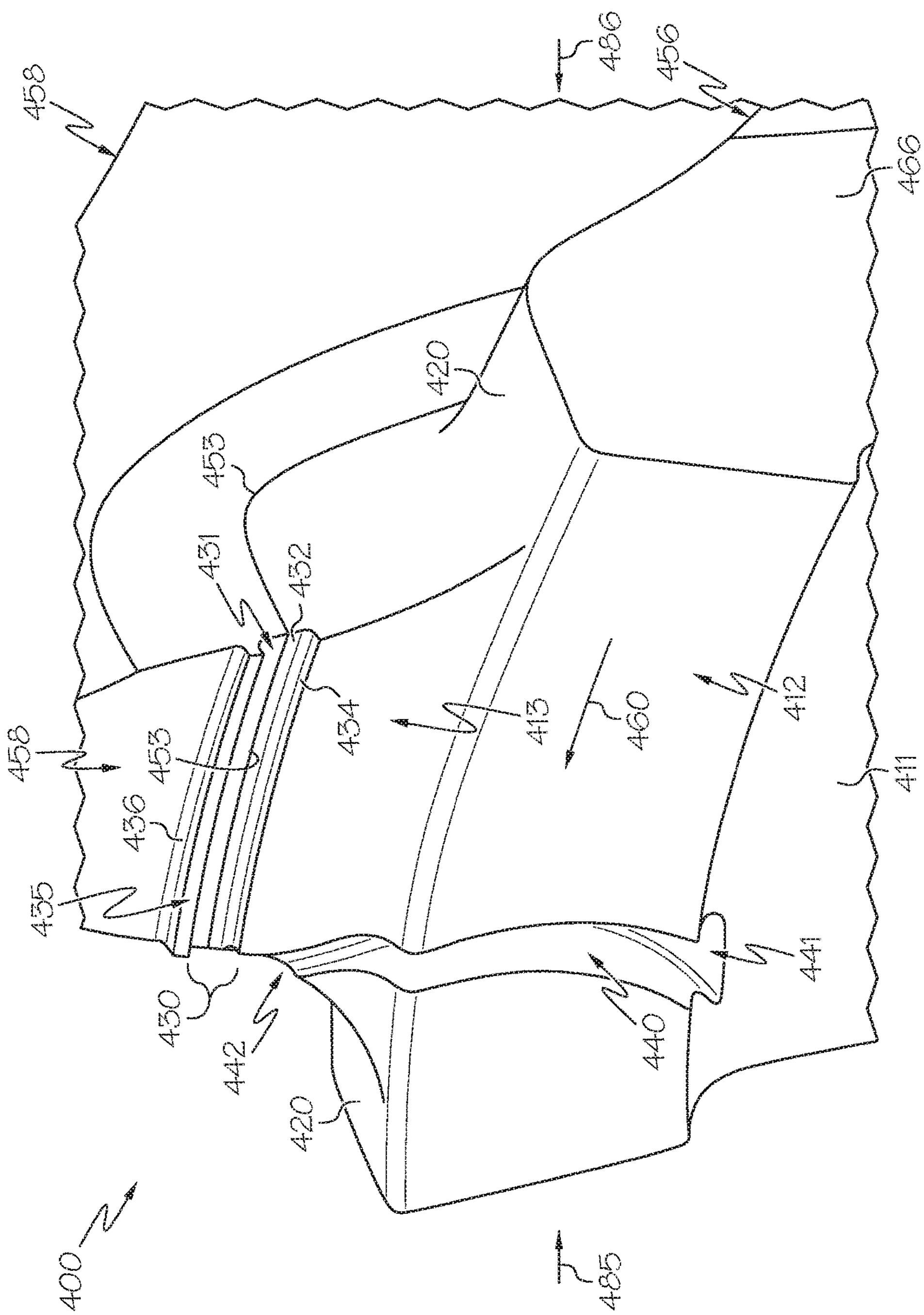
FIGS. 4A-4C are exemplary perspective, cross-sectional, and end views, respectively, of a rotating machine that includes bond line cooling in accordance with embodiments of the present disclosure.
Figure 4B:
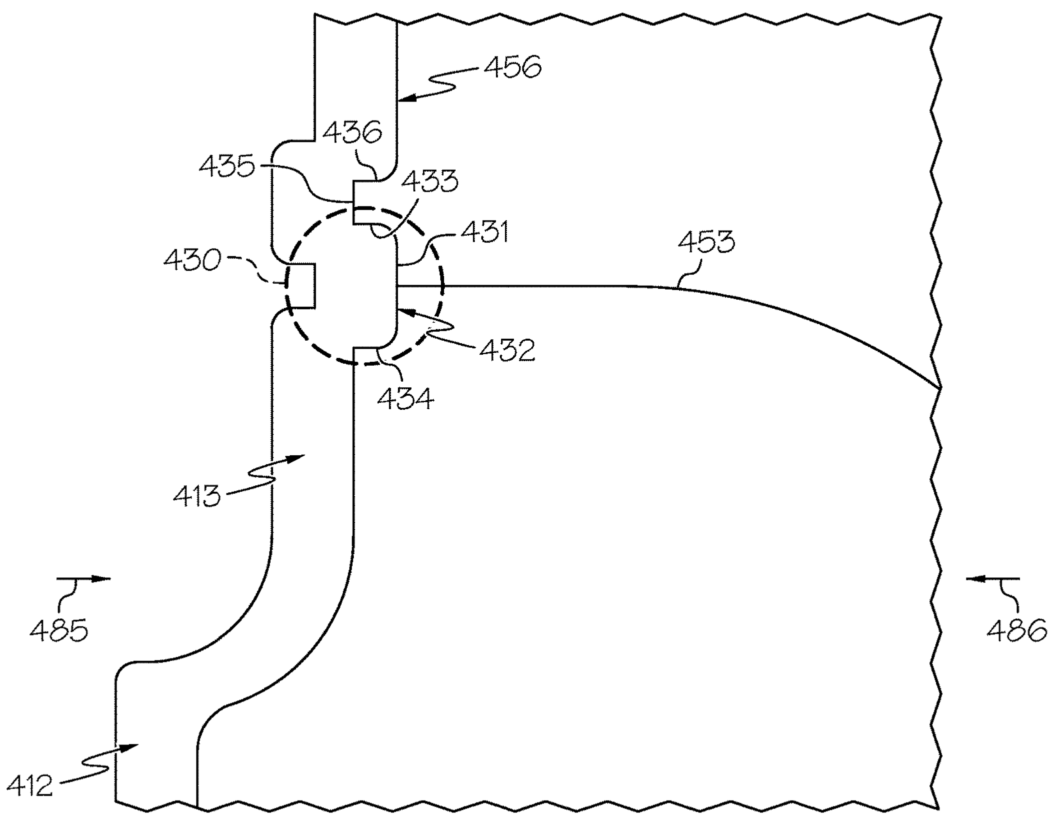
Figure 4C:
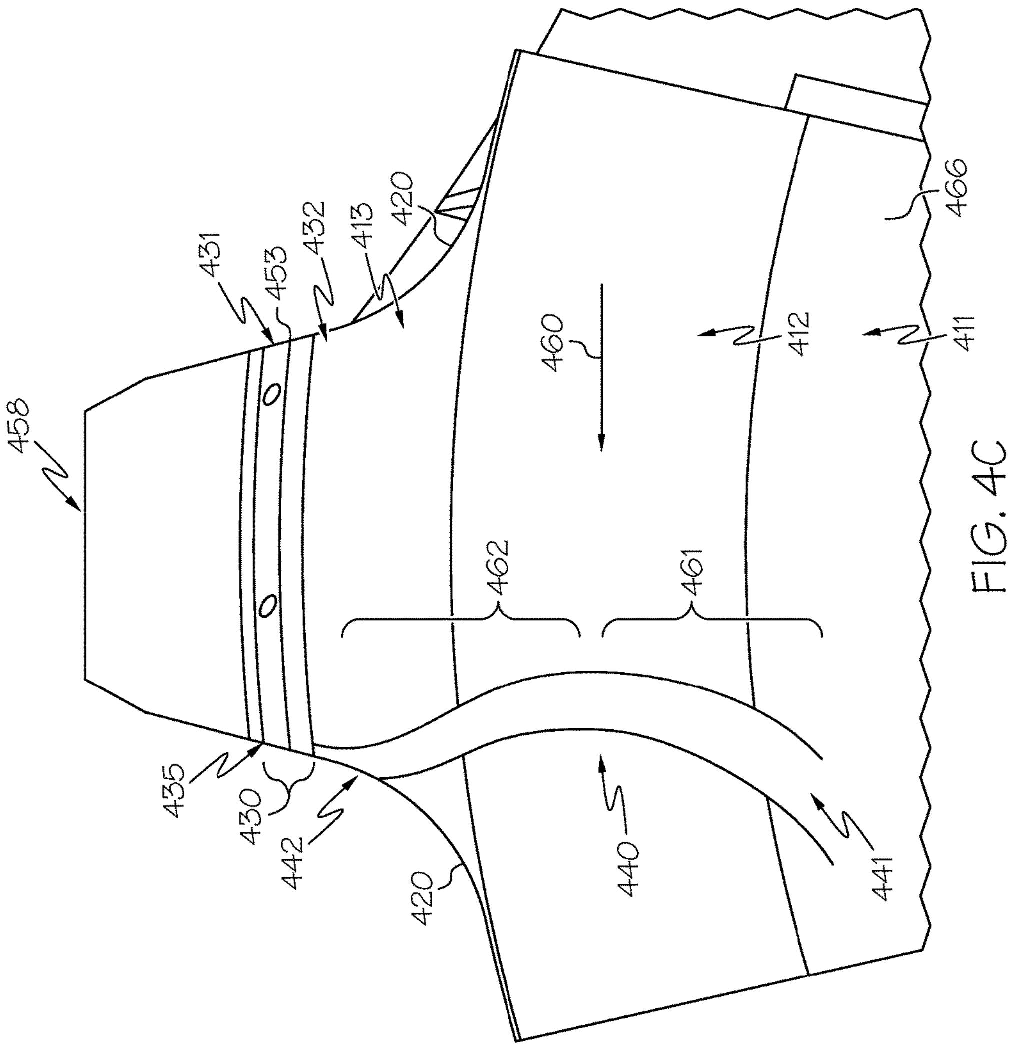

For purposes of illustrating the inventive subject matter, the reader is directed to FIGS. 4A-4C which provide various views of the cooling channel implemented in the context of a hub/ring bonded radial turbine 400. However, it should be appreciated that the skilled artisan, based on this illustration, will easily be able to implement such a cooling channel in accordance with the principles of the present disclosure on any other rotating machine, whether turbine or otherwise, whether having a bond line between the hub portion and the ring portion or otherwise.

With particular attention now to FIG. 4A, radial turbine 400 includes hub portion 466. Hub portion 466 should be understood as having a forward face, which is generally understood as that portion of the hub facing at directional arrow 485, and an aft face, which is generally understood as that portion of the hub facing at directional arrow 486, the forward and aft faces being on axially opposite sides of the hub portion 466 from one another. Moreover, hub portion 466 should be understood as having an outer circumference, which is generally understood as encompassing portions of the bond line 453 and portions of the "saddle" region 420 between blades, and an inner circumference, which, although not visible in any illustration, is generally understood as a hollow cavity of the hub portion 466 through which a shaft or other suitable rotating object may be inserted. It is noted that, with particular regard to the outer circumference, it should not be understood that the term "circumference" implies a perfectly circular profile. Rather, as clear from FIG. 4A, the outer circumference includes various contours and shaping to allow for improved bonding and manufacturing characteristics.

Additionally, radial turbine 400 includes a ring portion 456. Ring portion 456 should be understood as having a forward end, which is generally understood as that end oriented towards directional arrow 485, and an aft end, which is generally understood as that end oriented towards directional arrow 486. Moreover, ring portion 456 should be understood as including an inner circumference, which is generally understood as that portion disposed along bond line 453. However, like the hub portion 466, the term "circumference" does not mean to imply the need for a perfectly circular profile, with contours and shaping being allowable for improved bonding and manufacturing characteristics. In some embodiments of the present disclosure, as with radial turbine 400, the ring portion 456 includes a plurality of blades 458 extending radially outward from the ring portion 456. The shape and configuration of these blades depends on the particular style of rotating machine, and in the present case of a radial turbine the blades are configured having inducer and exducer portions, as well-known in the art. In the alternative case of an axial turbine, the blades would be configured as airfoils, having a leading edge and a trailing edge, as also well-known in the art.

With continued reference to FIG. 4A, and with further reference now to FIG. 4B, the cross-sectional profile of the hub portion 466 and the ring portion 456 (as bonded together along bond line 453) will be presently discussed, and in particular the cross-sectional profile at the forward face/end thereof, which in this implementation includes the novel bond line cooling features of the present disclosure. (In other implementations, the cooling features may be at the aft face/end.) Broadly, the forward face of the hub portion 466 may be considered to have three concentric, annular regions 411, 412, and 413, with annular region 411 being the inner most region, and annular region 413 being the outermost region. In terms of axial position (forward or aft), the middle annular region 412 has the most axially-forward extending face profile, whereas annular regions 411 and 413 have faces that are axially-aft of the axial face of the middle annular region 412. FIG. 4A shows all three concentric, annular regions 411-413, whereas FIG. 4B only shows all of region 413 and part of region 412.

As further evidenced in FIGS. 4A and 4B, along the forward face of the hub 466 and within outer annular region 413, there is a circumferential recess 432 that causes the forward face to recess axially aftward (forming a small, radially-outward facing surface 434) as it adjoins with the outer circumference of the hub 466. This recess 432 extends circumferentially about the entire hub 466. The recess 432 may be formed by machining the hub portion 466 after bonding with the ring portion 456.

Turning now to the forward-end profile of the ring portion 456 as illustrated in FIGS. 4A and 4B, it is evidenced that the ring portion 456 forward end is configured so as to be axially flush with the recess 432 of the hub portion 466 at the bond line 453, as indicated by region 430. However, radially above the bond line 453, the forward end of the ring portion 456 includes a circumferential flange 435 that extends axially forward of the region 431, and is defined by a radially lower surface 433 and a radially upper surface 436. Above the radially upper surface 436 of the flange 435, the ring 456 resumes the forward end profile, which may or may not be coplanar with region 431. The flange 435 extends aftward to a distance so as to be coplanar or staggered with the face profile of annular region 413 of the hub portion 466. As such, when the hub portion 466 is bonded to the ring portion 456, the recess 432 and the flange 435 cooperate to form a bond line channel 430 that extends circumferentially along the bond line. More particularly, the bond line channel is defined by the radially lower surface 433 of flange 435, the region 431 of the forward end of the ring 456 adjacent the bond line 453, the recess 432 of the hub 466, and the radially-outward facing surface 434 of hub 466 adjacent the recess 432. Being that the bond line 453 is radially above the saddle 420 of the hub 466, it should be appreciated that the circumferential bond line channel 430 does not form a completed circle, but rather is intermittent along an imaginary circle that passes through each forward end portion of the bond line 453. The bond line channel 430 functions to distribute cooling air along the bond line 453, thereby maintain the bond line at acceptable temperatures in terms of operating stresses and LCF when the radial turbine 400 is impinged with hot gasses during operation. The bond line channel 430 is fed with cooling air from a cooling channel formed into the forward face of the hub 466, as will be described in greater detail below. This cooling air that feeds the cooling channel is supplied from a separation space between the rotor and an adjacent static structure axially forward of the rotor, as best illustrated in FIG. 4B.

With particular attention now to FIGS. 4A and 4C, the above-noted cooling channel, indicated with reference numeral 440, is formed into portions of the forward face of the hub 466. Of course, in other appropriate embodiments, the cooling channel could be at the aft face. In either case, as illustrated, the cooling channel 440 extends radially outward along the face from a radially inner location 441 along the face to a radially outer location 442 along the face. In the illustrated embodiment, the radially inner location 441 is provided between annular regions 411 and 412 of the forward face of the hub 466, and the radially outer location 442 is provided radially below the bond line channel 430 within annular region 413 (i.e., between the low-point of the saddle 420 and the bond line 453). The cooling channel 440 may be formed by machining the hub portion 466 after bonding with the ring portion 456, and as such is configures as a recess formed into the surface of the forward face of the hub portion 466. Of course, with regard to the entire radial turbine 400, multiple cooling channels 440 may be formed, one for each of the intermittent segments of the bond line channel.

With particular attention to FIG. 4C, it is evidenced that the cooling channel 440 does not form a linear path (extending radially outwardly) between the radially inner location 441 and the radially outer location 442, but rather follows a curved path. At this point in the discussion, it should be noted that arrow 460 indicates the direction of rotation of the radial turbine 400. As such, the curved path of the cooling channel 440 may be defined as having various portions which, while always extending radially outward, also extend at an angle that is either with the direction of rotation or against the direction of rotation. The illustrated cooling channel 440 may thus be defined as having a radially inner portion 461 and a radially outer portion 462. The radially inner portion 461 may be angled against the direction of rotation (arrow 460), while the radially outer portion 462 may be angled with the direction of rotation. The mid-point between the portions 461 and 462 may be appropriately disposed within annular region 412 of the hub 466.

It should be noted that, axially forward of the hub portion 466 (but not separately illustrated), a cavity may exist that encloses air at a temperature less than that of the hot air impinging upon the blades 458 (i.e., which is referred to herein as "cooling air"). This cooling air may be supplied to the cavity from any suitable location of the apparatus in which the rotating machine is operating. For example, in the context of a turbine rotor operating in a turbine engine, the cooling air may be supplied from an appropriate bypass duct, or the like. Thus, the source of the cooling air forward of the hub 466 should not be considered limiting of the described embodiments in sense.

In operation, therefore, the rotation of hub portion 466 causes the cooling air to be forced through the cooling channel 440 from the radially inner location 441 to the radially outer location 442. The curvature of the cooling channel 440, with the radially inner portion 461 thereof being angled against the direction of rotation, causes the cooling air to be efficiently directed into the channel upon rotation. In the illustrated embodiment, the cooling air is then pushed back with the direction of rotation and radially outward through the channel 440. Thereafter, upon exiting the channel 440 through the radially outer location 442, the cooling air is ideally positioned for intake into the bond line channel 430, located radially there-above. The cooling air thus passes into the bond line channel 430, where it performs the desired function of maintaining the temperature of the bond line at a suitably low temperature to prevent device failure and/or accelerated LCF.

Broadly speaking, the general purpose of the cooling channel is to collect the cooling air from an area of low relative velocity and increase its kinetic energy/momentum by "pumping" it to a higher radius. While the "inlet" of the channel 440 (i.e., location 441) should have in general a strong tangential component (i.e., be directed against the rotational direction 460), the "exit" of the channel 440 (i.e., location 442) may be directed as preferred to infer radial, tangential, and axial velocity components. The cross sectional area of the channel 440 may also be optimized to achieve the desired effect, in a given embodiment. On average, the channel 440 will start relatively wide and will then progressively narrow as the cooling air is pumped to a higher radius. This will accelerate the relative velocity of the flow, therefore increasing momentum. The cross sectional shape can also be optimized to achieve the most desirable "pumping" effect.

Accordingly, the present disclosure has provided embodiments of rotating machines that include directed cooling features. Desirably, the provided cooling features prevent structural failure of the rotating machine during operation, as well as inhibit LCF. The embodiments are easily manufactured by the simple machining of the disclosed features onto portions of a rotating machine. The described embodiments desirably achieve the dual benefits of selectively cooling certain portions of rotating machines and actively controlling cooling flow in rotating machines.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A rotating machine comprising:

a hub portion, wherein the hub portion comprises an outer circumference, an inner circumference, and a face;

a ring portion, wherein the ring portion comprises an inner circumference that is metallurgically bonded to the outer circumference of the hub portion along a circumferential bond line; and a cooling channel formed on the face and configured to direct cooling air to the bond line, wherein the cooling channel extends from a radially inner location along the face to a radially outer location along the face, and wherein the cooling channel is configured as a recess formed into an outer surface of the face, wherein the ring portion further comprises an end, wherein the end comprises a circumferential flange extending outward from the end and positioned radially above the bond line, wherein the face of the hub portion includes a circumferential recess radially below the bond line, wherein the flange and the recess define a circumferential bond line channel along both the end and the face that distributes cooling air circumferentially along the bond line, wherein the radially outer location along the face is positioned radially below the circumferential bond line channel, and wherein, at the radially outer location along the face, the cooling channel joins fluidly with the bond line channel such that the cooling air is able to flow from the cooling channel into the bond line channel.

2. The rotating machine of claim 1, wherein the cooling channel comprises a radially inner portion defined from the radially inner location along said face to a mid-point location along said face, and a radially outer portion defined from the mid-point location along said face to the radially outer location along said face, wherein the radially inner portion is angled against a direction of rotation of the rotating machine as the cooling channel extends radially outward.

3. The rotating machine of claim 2, wherein the radially inner location along said face is positioned radially above and separated by a distance from the inner circumference of the hub portion.

4. The rotating machine of claim 1, wherein the ring portion is a bladed ring comprising a plurality of blades extending radially outward from the ring portion.

5. The rotating machine of claim 4, wherein the bladed ring and the hub portion together comprise an axial turbine or compressor.

6. The rotating machine of claim 4, wherein the bladed ring and the hub portion together comprise a radial turbine or impeller.

7. The rotating machine of claim 6, wherein the radially outer location along said face is positioned adjacent to a saddle portion of the radial turbine or impeller between blades of the radial turbine or impeller.

8. The rotating machine of claim 1, wherein the hub portion is formed from a first alloy and the ring portion is formed from a second alloy, and wherein the first alloy and the second alloy are different.

* * * * *